United States Patent

[11] 3,603,612

| [72] | Inventors | William Frank Hill<br>Stafford;<br>Lancelot Phoenix, Birmingham, both of,<br>England |
|---|---|---|
| [21] | Appl. No. | 844,289 |
| [22] | Filed | July 24, 1969 |
| [45] | Patented | Sept. 7, 1971 |
| [73] | Assignee | Joseph Lucas (Industries) Limited<br>Birmingham, England |
| [32] | Priority | July 29, 1968 |
| [33] | | Great Britain |
| [31] | | 36025/68 |

[54] SUSPENSION SYSTEMS FOR ROAD VEHICLES
1 Claim, 1 Drawing Fig.

[52] U.S. Cl. .................................................. 280/124 F,
188/299, 188/318, 267/65 D
[51] Int. Cl. .................................................. B60g 9/00
[50] Field of Search.......................................... 267/8, 65
D; 280/124 F; 188/87, 266, 267, 299, 3.18

[56] References Cited
UNITED STATES PATENTS

| 2,992,837 | 7/1961 | Rabow | 280/124 (F) |
| 3,035,853 | 5/1962 | Klein | 280/124 (F) |
| 3,174,587 | 3/1965 | Walton | 188/87 |
| 3,290,035 | 12/1966 | Enke | 267/8 |
| 3,393,921 | 7/1968 | Wilkins et al. | 280/124 (F) |

*Primary Examiner*—Milton Buchler
*Assistant Examiner*—Stephen G. Kunin
*Attorney*—Holman, and Stern ABSTRACT: In a road vehicle suspension the damping of the system is greater at high speeds than low speeds. Typically, a plurality of shock absorbers having adjustable damping characteristics are used, and electromagnetic means adjust the damping characteristic of each shock absorber under the control of speed responsive means so that the damping is increased above a predetermined speed of the vehicle.

PATENTED SEP 7 1971
3,603,612
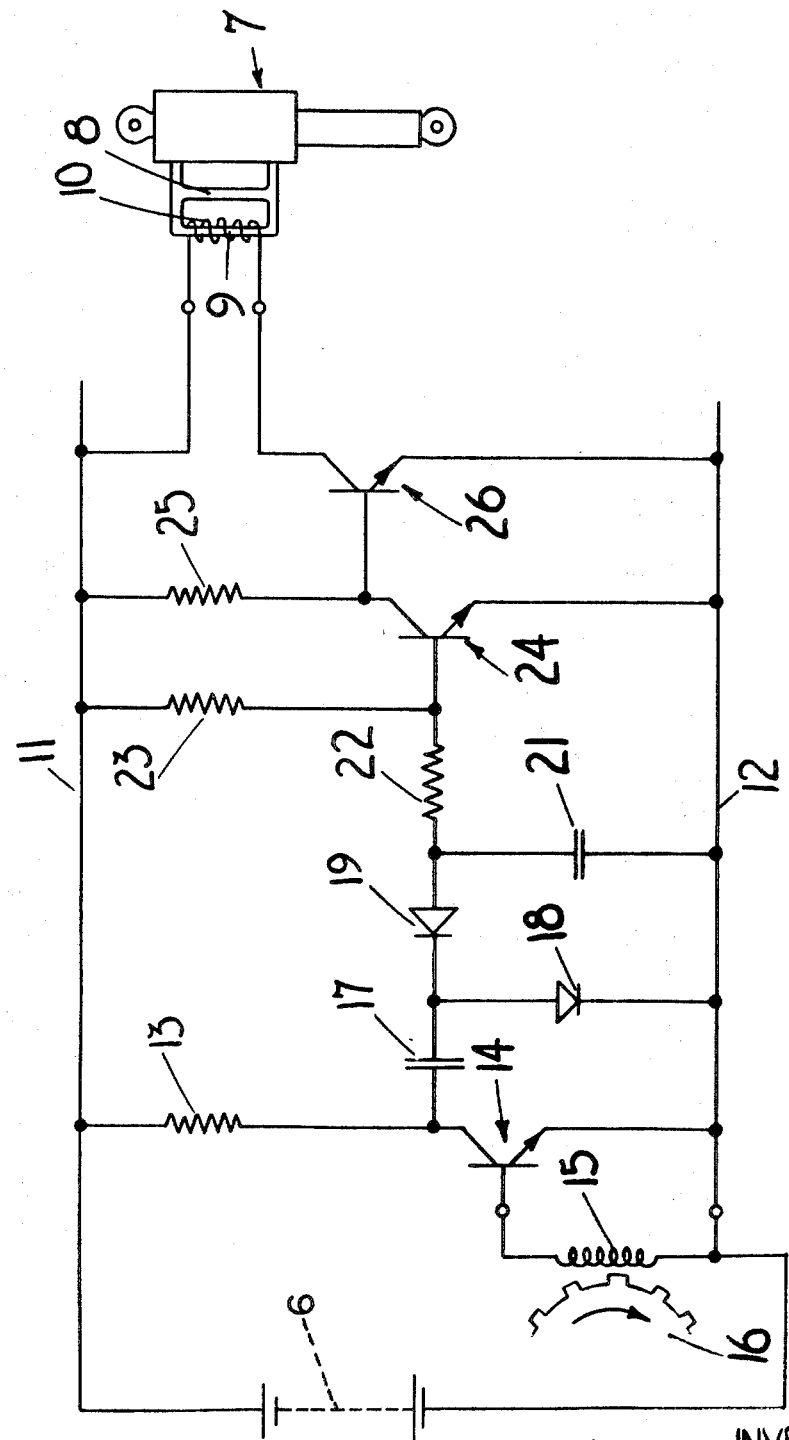
INVENTOR
William Frank Hill + Lancelot Phoenix
BY Holman, Blaycock,
Downing & Seebold
ATTORNEYS

SUSPENSION SYSTEMS FOR ROAD VEHICLES

This invention relates to suspension systems for road vehicles, and in its broadest aspect resides in a suspension system in which the damping of the system is greater at high speeds then low speeds.

It is difficult to design a suspension system which is suitable for low speed driving and also for high speed driving, ans suspension systems normally are a compromise between the two requirements. Consequently, both settings are a compromise and the results are below optimum at both high and low speeds. By using adjustable shock absorbers and adjusting the damping, optimum results can be obtained at both high and low speeds. Preferably the damping is increased at a predetermined speed.

The accompanying drawing is a circuit diagram illustrating one example of the invention.

Referring to the drawing, a shock absorber of the vehicle in indicated diagrammatically at 7, and incorporates a pair of restrictors 8, 9 in parallel. Associated with the restrictor 9 is a winding 10 which when energized blocks the restrictor 9. With both restrictors 8, 9 operating, a lightly damped suspension is produced. With the restrictor 9 blocked by energization of the winding 10, the restrictor 8 operates on its own to produce a stiffer suspension. It will be appreciated that each shock absorber has a similar pair of restrictors, with the associated windings 10 connected in parallel.

The battery 6 of a vehicle supplies power to a positive line 11 and a negative line 12, and connected to the line 11 through a resistor 13 is the collector of an NPN transistor 14, the emitter of which is connected to the line 12 and the base of which is connected to the line 12 through a winding 15. The winding 15 is mounted near the teeth of the crown wheel 16 of the differential gear of the vehicle, so that pulses are produced in the winding 15 when the vehicle is in motion.

The collector of the transistor 14 is connected to the line 12 through a capacitor 17 and a diode 18 in series, the junction of the capacitor 17 and diode 18 being connected to the line 12 through a further diode 19 and capacitor 21 is series. The junction of the diode 19 and capacitor 21 is connected through a pair of resistors 22, 23 to the line 11, the resistor 23 being variable and the junction of the resistors 22, 23 being connected to the base of an NPN transistor 24 having its emitter connected to the line 12 and its collector connected to the line 11 through a resistor 25. The collector of the transistor 24 is further connected to the base of an NPN transistor 26, the emitter of which is connected to the line 12 and the collector of which is connected to the line 11 through the windings 10 in parallel.

In a normal condition of the circuit, current slow through the resistor 23 turns on the transistor 24 so that the transistor 26 is off, and both restrictors 9 and 8 are in use. The pulses generated in the winding 15 control conduction of the transistor 14, and the capacitors 17 and 21 together with the diodes 18 and 19 form a diode pump circuit which acts in the usual way to develop across the capacitor 21 a voltage dependent of the speed of the vehicle. The arrangement is such that below a predetermined vehicle speed, the transistor 24 remains on, but at the chosen vehicle speed the voltage at the anode of the diode 19 rises to a point at which insufficient current flows through the resistor 23 to keep the transistor 24 on. The transistor 24 now turns off, so that current flowing through the resistor 25 turns on the transistor 26, so energizing the windings 10 so that the restrictor 9 associated with each shock absorber 7 is no longer in use, and the damping characteristics alter in the manner previously explained. The resistor 23 can of course be set to adjust the speed at which the change takes place.

We claim:

1. A road vehicle suspension system comprising in combination a plurality of shock absorbers having adjustable damping characteristics, each of said shock absorbers incorporating a restrictor with which is associated an electromagnetic winding which when energized blocks said restrictor thereby increasing the damping characteristic of each shock absorber, a first transistor, means coupling said first transistor to said windings, means biasing said first transistor to conduction, a second transistor, means coupling said second transistor to said first transistor whereby said second transistor when conductive turns said first transistor off, a pump circuit including a capacitor, means coupling said pump circuit to said second transistor whereby said pump circuit turns said second transistor off when the voltage across said capacitor reaches a predetermined level, a toothed wheel driven by the engine of said road vehicle, and electromagnetic pickup means operable by said toothed wheel to charge said capacitor to a level which increases with the speed of the vehicle, whereby said second transistor is turned off above a predetermined speed of the vehicle.